Sept. 4, 1962

V. H. PAVLECKA 3,052,096

GAS TURBINE POWER PLANT HAVING CENTRIPETAL
FLOW COMPRESSORS AND CENTRIFUGAL
FLOW TURBINES

Filed Sept. 8, 1958

INVENTOR.
VLADIMIR H. PAVLECKA
BY
Nicholas T Vohn
HIS ATTORNEY.

Sept. 4, 1962

V. H. PAVLECKA 3,052,096

GAS TURBINE POWER PLANT HAVING CENTRIPETAL
FLOW COMPRESSORS AND CENTRIFUGAL
FLOW TURBINES

Filed Sept. 8, 1958

INVENTOR.
VLADIMIR H. PAVLECKA
BY
Nicholas T Volk
his ATTORNEY.

United States Patent Office 3,052,096
Patented Sept. 4, 1962

3,052,096
GAS TURBINE POWER PLANT HAVING CENTRIPETAL FLOW COMPRESSORS AND CENTRIFUGAL FLOW TURBINES
Vladimir H. Pavlecka, 1176 Monument St., Pacific Palisades, Calif.
Filed Sept. 8, 1958, Ser. No. 759,624
22 Claims. (Cl. 60—39.36)

This invention relates to power plants using centripetal flow compressors and centrifugal flow turbines which can be used as prime movers, air generators and gas generators.

The evolution of the centripetal compressor can be traced through applicant's granted patents, U.S. Patent No. 2,712,895, issued July 12, 1955, entitled "Centripetal Subsonic Compressor" and U.S. Patent No. 2,804,747, issued September 3, 1957, entitled "Gas Turbine Power Plants," and pending applications Serial No. 513,947, filed June 8, 1955, for "Radial Dynamic Machines Including Centripetal Compressors and Centrifugal Turbines"; Serial No. 514,001, filed June 8, 1955, for "Methods of Compressing Fluids with Centripetal Compressors." Application Serial No. 513,947 also discloses improvements in centrifugal flow turbines.

Throughout the above prior inventions of the applicant, it has been stressed that thermodynamic efficiency of gas turbine power plants is a function of compression ratios and that as long as the compression ratio is reasonably high, it is possible to obtain an efficient gas turbine power plant without the use of any heat exchangers. When maximum pressure is reasonably high, the temperature of compressed air is higher, or at least equal, or approaches, the temperature of the exhaust gases and under such conditions it is not feasible to use a heat exchanger.

It now has been established, through theoretical studies of the gas turbine cycles, that when a gas turbine power plant has 100% efficient compressor, turbine and combustion chamber, the efficiency of the cyclic process is solely the function of the compression ratio and not of the temperature. It now also has been established experimentally that the centripetal compressor is the most efficient dynamic compressor, which is also true of the toroidal combustion chambers. For the description of performance of the combustion chambers using a vortex flow, see Royal Aeronautical Society Journal, April 1958, vol. 62, No. 568, pp. 257–267, Mr. Hayne Constant's "Sir Henry Royce Memorial Lecture." The fact that the centrifugal flow turbines are more efficient than any other turbines has been known for at least forty years. Accordingly, power plants utilizing centripetal compressors, toroidal chambers and centrifugal turbines are capable of reaching high efficiencies, and in this manner approach the above ideal of having efficiencies which are the functions of the compression ratio.

The elimination of the heat exchangers results in the simplification of the entire circuitry and maintenance of the power plant and lower costs without any sacrifice in quality. Quite on the contrary, the quality of the power plants of the type disclosed here is higher than of the known plants using heat exchangers because of the inherent geometric simplicities, drastic reduction in specific weights and volumes, and better performance characteristics, such as acceleration and deceleration, as well as reasonably high efficiency throughout the greater portion of the part load operation of such power plants. It should be kept in mind that heat exchangers have high calorific inertia.

The above advantages are obtained with the disclosed power plants which represent completely integrated, unified, self-contained entities, with the compressor, turbines and combustion chamber being combined into a single integrated unit, with the absence of any external ducting and with the internal ducting being reduced to an absolute minimum since the compressor discharges directly into the toroidal combustion chamber without any diffusers being interposed between the compressor and the chamber, and with no ducting between the chamber and the turbine since the chamber also discharges directly into the turbine. It thus becomes possible to design power plants as a complete, single monoblock entity, while in the prior art compressor, combustion chamber and turbine are designed as three separate, independent units connected to each other through an external ducting.

Power plants are disclosed in which the chamber constitutes an integral part of the innermost rotor, with the result that the chamber rotates with this inner rotor. In other power plants, the chamber is a stationary chamber which is fluid-dynamically coupled to the output stage of the compressor and the input stage of the turbine.

All power plants have a plurality of rotors (at least two rotors) with each rotor having a plurality of compression stages (at least two compression stages) and at least one or a plurality of turbine stages, with the compression stages of the outermost rotor interleaving the compression stages of the succeeding rotor, with the adjacent rotors rotating in opposite directions. Power plants are also disclosed which have three rotors, each rotor including a plurality of compression stages and a plurality of turbine stages, with the stages of the adjacent rotors being interleaved for obtaining contra-rotatable machines. Due to the contra-rotation, it becomes possible to obtain high compression ratios with a minimum number of stages and with relatively low peripheral velocities. Such low peripheral velocities permit the use of conventional materials such as steel stampings (rather than expensive alloys, with the power plant having many machined surfaces), for making the units, thus further reducing the cost of the disclosed power plants.

The contra-rotation principle also produces power plants which have low specific weight and, accordingly, low specific volume and fast acceleration and deceleration because of low inertia, and which do not have or do not produce any turning couple, or turning forces, such as those produced in a single rotation power plant. Single rotation power plants also act as extremely powerful gyroscopes which make more difficult the maneuverability of moving objects with which such plants are associated. For example, when jet power plants are used in vertical take-off and landing aircraft (VTOL), the maneuverability and control of VTOL is made more difficult because of the aforementioned gyroscopic effect and turning couple. Such effect is hardly present in the contra-rotatable power plants having a plurality of rotors and a stationary combustion chamber. If so desired, the turning force couple can be eliminated altogether by balancing the contrarotatable rotors. The absence of the gyroscopic effect, obviously, is also desirable in conventional aircraft and helicopters. It is also true of land vehicles, such as automobiles.

It is, therefore, an object of this invention to provide gas turbine power plants having a plurality of contra-rotatable rotors, each rotor having a plurality of centripetal flow compression stages and either one or more centrifugal flow turbine stages.

It is also an object of this invention to provide gas turbine power plants of the above type which utilize a toroidal combustion chamber, either of stationary or rotatable type, the chamber being an integral part of the innermost rotor when it is a rotatable chamber.

It is an additional object of this invention to provide power plants having a plurality of rotors which have neither rotatable nor stationary central shafts, with the rotors of the power plant including only the compressor and the turbine stages and all rotors being mounted on air bearings.

It is an additional object of this invention to provide power plants of the above type with the air bearings being connected directly to the side hoop-rings of compressor stages on one side and the side hoop-rings of the turbine stages on the other side of the respective rotors, or, in another version, with the air bearings being mounted between a stationary frame and rotatable side disks supporting the respective rotors.

The novel features which we believed to be characteristic of this invention, both as to its organization and method of operation, will be better understood from the following description given in connection with the drawings in which.

Figure 1:
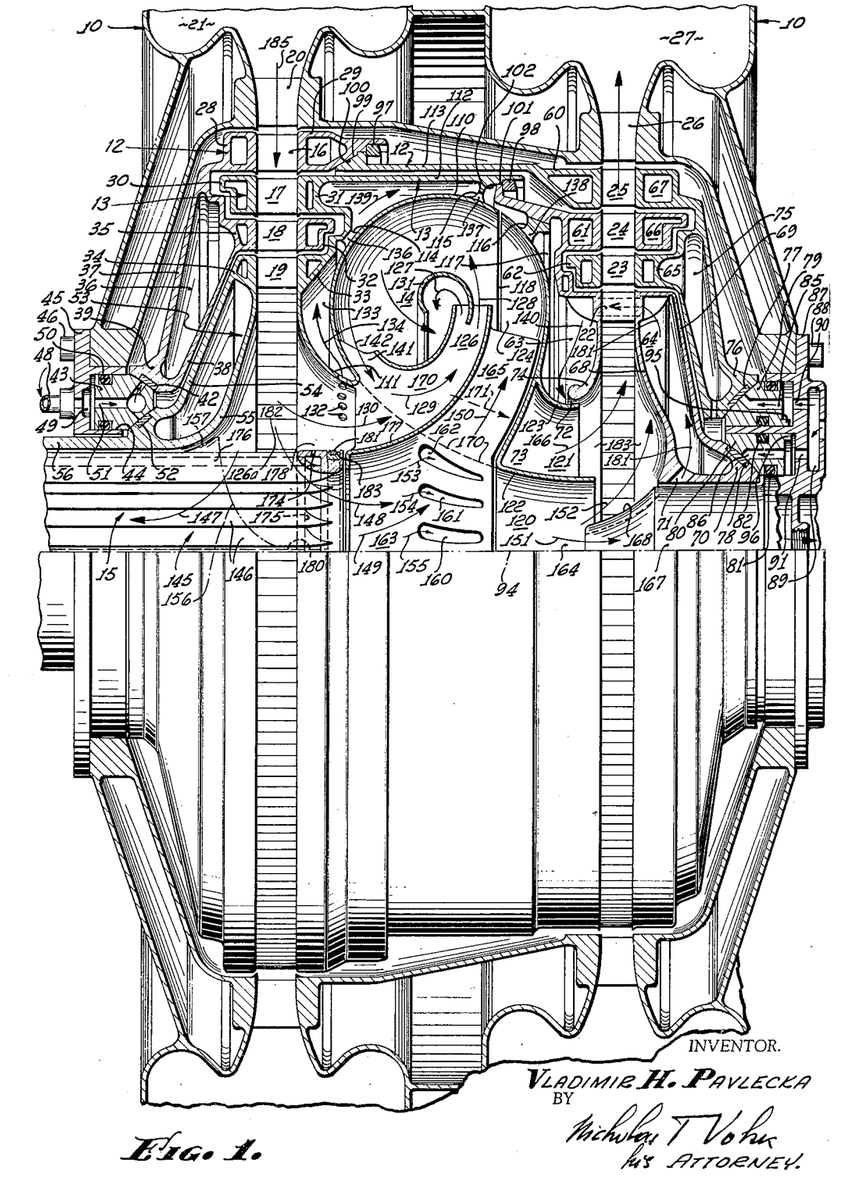
FIGURE 1 is a longitudinal, axial sectional view of an air generator having two rotors and a rotatable combustion chamber.

Referring to FIG. 1, it discloses a two-rotor air generator with an axially and centrally positioned stationary air duct for compressed air. The compressed air may be used in a load turbine or in some other machine operated by compressed air or compressed gases.

The main elements of the air generator include a frame 10, a first rotor 12, a second rotor 13 and a toroidal combustion chamber 14 which constitutes an integral part of the inner rotor. The inner rotor is built around the chamber with the compressor stages being on one side of the chamber and the turbine stages on the other side. The power plant also includes a stationary compressed air output duct 15. The compressor includes the first, second, third and fourth rotatable compression stages 16, 17, 18 and 19, respectively, the first stage being the input stage and the fourth stage being the output stage of the compressor. The compressor also includes a stator, or a stationary contra-prerotation stage, 20 for directing the air flow entering compressor hood 21, into the first stage 16. The turbine includes the first, second, third and fourth rotatable stages 22, 23, 24 and 25, respectively, and also a stationary diffuser stage 26 which receives the exhaust gases from the last stage 25 of the turbine, and, upon diffusion, discharges them into an exhaust hood 27. Hood 27 conveys exhaust gases into ambient air. Because of the contrarotation, it is possible to obtain sufficiently high compression ratio even with the compressor having only two contra-rotatable rotors 12 and 13 so as to make the use of the heat exchanger unnecessary. The functions performed by the compressor stator 20 are described in detail in U.S. Patents Nos. 2,712,895 and 2,804,747, and, therefore, no detailed description of this stage is necessary here. This stage may be either a subsonic or a supersonic stage, depending upon whether the first two or three stages of the compressor are supersonic or subsonic. In general, it is best for stator 20 to be supersonic if the first two stages of the compressor are supersonic.

As to the remaining rotatable stages 16 through 19 of the compressor, stages 16 and 17 may be supersonic or subsonic. When a reasonably constant speed operation is contemplated, it is feasible to have stages 16 and 17 operate as supersonic stages and then stages 18 and 19 as subsonic stages.

For a more detailed description of the supersonic centripetal flow compressors, reference is made to the copending application Serial No. 529,504, filed August 19, 1955 and entitled "Supersonic Centripetal Compressor," which is a divisional application of the parent application Serial No. 217,347, now U.S. Patent No. 2,804,747.

The turbine stages 23 through 25 are conventional 50–50 reaction-impulse turbine stages of the type described in the previously mentioned U.S. application Serial No. 513,947 while the input stage 22 is a subsonic-supersonic stage with a supersonic expansion nozzle on the output side of this stage. The input stages of this type are also fully described in application Serial No. 513,947. The input stage 22 of the turbine is air-cooled, the compressed air 181 entering a plurality of openings 71, hollow disk 64 and then flowing through the hollow blades 22 of the turbine. This air flow also cools the side-walls 68 and 69 of the hollow disk 64 and the side-wall 74 of the input duct 183. The diffusion stator 26 is also fully described in the above mentioned application Serial No. 513,947. It is the purpose of this diffuser to enable the very last turbine stage 25 to work into a pressure which is lower than the pressure found in hood 27 since diffuser 26 creates a reduced pressure in the gap between the rotatable turbine stage 25 and stator 26.

The airfoils of the compressor are brazed to hollow rings 28 through 35. The outer rings 28 and 35 of the first and third compressor stages are connected together by a slanting, or inclined, hollow side-disk 36 which has one, slanting, outer side wall 37 and a second, slanting, inner side wall 38. The inner portions, closest to the axis of rotation 94, of the side walls 37 and 38 are joined together to form a seat 39 for mounting a rotor 42 of an air bearing. The stator member 43 of this bearing is mounted in a seat 44 provided in a frame member 45 connected to the main frame 10 by means of bolts 46. The frame member 45 is also provided with an air duct 48 which conveys compressed air for the air bearing into a chamber 49 within the frame member 45. The air bearing stator 43 is provided with two O-rings 50 and an air duct 51 which conveys the compressed air to two air bearings. One air bearing is the already described bearing including rotor 42 and stator 43, and the other bearing includes stator 43 and a rotor 52 which is connected to a hollow side disk 53 of the second rotor 13. This side disk includes an outer wall 54, an inner wall 55 and a shaft 56 which is used for driving the auxiliary equipment of the power plant. The turbine side of the power plant, in its configuration, is similar to that of the compressor side. It includes hollow rings 60 through 67, ring 64 being enlarged into a hollow side disk with side walls 68 and 69 and a bearing seat 70. The hollow side-disk 64, and especially the lower portion of the side wall 68, is provided with a plurality of air vents 71 which are used for admitting compressed air into the side disk. This air then travels through all the hollow blades of the first turbine stage 22 and then through the hollow member 63, and leaves the latter through an opening 72 whereupon it rejoins the stream of gases leaving combustion chamber 14 through a plurality of exhaust ducts 73. The air entering orifices 71 is used for cooling side wall 68, the first, or the input, stage 22 of the turbine, and also the side walls 74 and 68 of the side disk 63. The first, or the outer, rotor 12 also includes a hollow turbine side disk 75 which also includes an air bearing seat portion 76 for accommodating a bearing rotor 77. The air bearing rotors 77 and 78 engage their respective stators 79 and 80 which are provided with O-rings 81 and 82 and air vents 85 and 86. Frame 10 is also provided with an air bearing plate 87 fastened to the frame by means of bolts 88. This plate is provided with a compressed air chamber 89 which has ducts 90 and 91 opening into the ring-shaped chambers accommodating the ring-shaped stators 79 and 80. The air bearing stators are pressed into proper working air-gap engagement with the air bearing rotors by the air pressure exerted on that side wall of the stators which is adjacent, or faces, air chamber 89. The working air-gap clearances in the air-bearings are quite small and, for this reason, it becomes necessary to make one of the air-bearing stators laterally adjustable. For this reason, the stators 79 and 80 are made slidingly adjustable, while stator 43 is made fixed. Moreover, the two rotors 12 and 13 expand in the radial as well as in the axial directions, and such expansion requires that one of the bearing's stators should be made slidable in the axial direction. All of the bearings illustrated in FIG. 1 are aerostatic bearings. A number of openings or vents, such as vents 85 and 86, are uniformly distributed along the entire periphery of the stator seating surfaces through the body of the stators, these openings supplying compressed air into the normally maintained air gap between the stator and the rotor with compressed air either from the compressor or from some external pressure source. The air lifts the bearing rotors from the bearing stators by a very small dimension, known to be approximately .001 inch, and makes the rotating concave surface of the bearing rotor float on a thin film of air escaping from the orifice outwardly and constantly regenerating itself from the supply of air. The concave surface of the rotor and the matching convex surface of the stator have a radius which has its origin, or center, resting on the axis of rotation 94.

Examination of the air bearings on the left side of the rotors, as compared to the air bearings on the right side of the rotors, discloses that the lateral position of the left bearings is fixed within frame 10. The right side bearings, and especially stators 79 and 80, are capable of sliding in the axial direction until they either engage—on the right side—plate 87 or—on the left side—the hollow disks 75 and 64 and especially the rotors 77 and 78.

It is to be noted, of course, that at no time is it possible for the stators to assume such position that there is no contact between the rotors and the stators. It also should be noted here that all of the air bearing stators are properly keyed with respect to the frame or plates 45 and 87 so as to prevent rotation of the stators around the axis of rotation 94. The axial movement of the bearings is limited by appropriate stops, such as stops 95 and 96, which engage plate 87 immediately after the air pressure is removed from the ducts and chamber 89. As soon as the air pressure is conveyed to the bearings, the bearing stators push the right side, or the turbine side, of the rotors upwardly and an equilibrium position is reached when the air pressure and the rotation of the power plant rotors 12 and 13 reaches proper speed. For a more detailed description of the air bearings of the above type, reference is made to the co-pending application Serial No. 759,626, filed September 8, 1958, now U.S. Patent 2,916,332 issued December 8, 1959.

It does not appear necessary to describe or illustrate the transverse cross-sectional views of the compressor and turbine stages since such transverse views were already illustrated in the previously mentioned patents and pending application. It should be mentioned here, however, before concluding the description of the rotors, that each rotor may be considered as being composed of two halves, one half being the compressor portion of the rotor while the second half is the turbine portion of the rotor. These two portions of the rotor are joined together by means of a joint including rings 97 and 98 and two conical surfaces 99 and 100 for the outside rotor and surfaces 101 and 102 for the inner rotor. The rings 97 and 98 are pressed into the seats provided for this purpose in that portion of the rotor which has a greater diameter. These two joints connect the two halves of each rotor to each other, respectively.

The combustion chamber 14 includes an outer wall, or shell, 110 which is shaped as a hollow toroid connected to the second, or inner, rotor 13 by means of the flow-directing input funnel-shaped member 111 on the input side of the chamber. Toroidal shell 110 is also connected to the ring-shaped member 112, which acts as the outer wall of rotor 13, and also as the outer wall of the combination chamber 14. Ring 112 also acts as a structural member interconnecting the compressor and turbine stages. A similar ring 113 is also used for interconnecting the two halves of the first rotor. The additional members, which connect the toroidally-shaped wall 110 of the chamber to the second rotor, are members 114, 115, 116 and 117, all of which are provided with openings, or orifices, for permitting compressed air to flow through an air-cooled duct formed between wall 110 and ring 112 etc. The chamber is also provided with a seam 118 which divides the chamber into the right portion (as seen in the drawing) which is connected to the turbine side of the second rotor, and the left side connected to the compressor side of the second rotor. Accordingly, when the chamber is assembled, the left and the right sides are made to match each other along seam 118. The right side of the chamber also includes exhaust ducts 120 and 121 having a common wall 122 and an outer wall 123; it also includes a portion 124 of the torus itself. The compressor portion of the combustion chamber also includes a plurality of ducts 126 which are uniformly distributed around the entire periphery of the chamber for conveying compressed air from the compressor directly into the central portion of the combustion chamber as illustrated by arrows 127, 128, 129 and 130. All of the ducts 126 find their common origin in a single, centrally located funnel 126α which conveys some of the compressed air into the ducts 126. Funnel 126a is a flow-accelerating funnel with the walls 111 and 177 acting as two flow-accelerating surfaces. It also includes a central flow-directing semicircular ring 131 which deflects some burning gases flowing through and then leaving duct 126 to the central portion of the chamber, as indicated by arrow 127. The input funnel 126a is also provided with a plurality of orifices 132 so that some of the compressed air enters duct 133 in the manner indicated by an arrow 134 and then reaches duct 135 through orifices 136, 137 and 138 provided in the connecting members 114, 112 and 116. This flow of compressed air is also illustraed by arrows 139 and 140. This air flow is used for cooling wall 110 of the chamber. The centrally located duct 126, which conveys air from the compressor into the central portion of the chamber, also includes a side duct 141 which enables a portion of hot gases circulating around the chamber and illustrated by an arrow 142, to enter duct 126 and become mixed with the compressed air entering duct 126 in the manner illustrated by arrow 130. Accordingly, arrow 129 represents an accelerated flow of intermixed air, fuel, burning fuel and hot gases which leave duct 126 in the manner indicated by arrows 127 and 128.

Some of the air leaving the compressor is conveyed to some machine, such as a load turbine, through a stationary duct 145, which has a plurality of flow directing blades 146. These blades are shaped so as to produce an air flow whose direction of flow is illustrated by an arrow 147. It is this portion of the compressed air which performs an external work in the previously mentioned external load turbine, or some other device which requires a supply of compressed air. Since the central stationary member, or duct, 145 may be considered to represent a hollow slotted open-end cylinder, an additional part of the air leaving the compressor also flows in the manner indicated by arrows 148, 149, 150, 151, 152, 153, 154 and 155. Arrows 153, 154 and 155 illustrate that flow which takes place through a plurality of slots, such as slots 160, 161 and 162, which are uniformly distributed around the entire periphery of duct 163. These slots represent the openings, or the input ends, of the ducts similar to duct 165. Therefore, these openings are uniformly distributed around the entire periphery of duct 163, which is also true of the ducts 126, the number of the ducts 165 being equal to the number of the ducts 126, these two ducts being paired with each other. The spacings between these ducts, around the circumference of the chamber, also define the corresponding number of the exit ducts which discharge hot gases into the turbine. The flow through these exit, or exhaust, ducts is illustrated by arrows 171 and 166. Duct 163 also discharges compressed air into a turbine branch duct 120 and a plurality of the combustion chamber branch ducts 165. The axially or centrally located ducts 163 and 120 convey compressed air directly from the compressor to the turbine in the manner indicated by arrows 148 and 152; thus, this portion of the compressed air by-passes the combustion chamber as represented by the toroid 110. This portion of the compressed air impinges upon the inner wall 68 of the hollow side disk 64, and thus cools this member, or provides a boundary layer of compressed air which, at least to some extent, protects wall 68 from hot gases flowing from the toroidal chamber into the turbine in the manner indicated by the arrows 171 and 166. The same is also true of the compressed air flowing through the hollow ring 63 of the turbine, this flow being represented by arrow 140. This portion of the compressed air, in a similar manner, furnishes a boundary layer of relatively cool compressed air for the second wall 74 of the radial centrifugal flow channel formed by the side walls 68 and 74 and also, in part, by a stationary member 167, which is provided with a flow-directing, curved, conical surface 168 for deflecting the air flow illustrated by arrow 152 into the radial flow input channel of the turbine.

Some of the compressed air also enters the hollow member 167 in the manner illustrated by an arrow 151 for supplying air for all the air bearings and duct 48 and chambers 49 and 89, if the compressed air produced by the compressor is used for supplying with air all the air bearings. As mentioned previously, an external source of compressed air may also be used for this purpose.

It thus follows that that portion of the compressed air which enters the combustion chamber 14 proper is represented by the flows illustrated by the arrows 130 and 150.

The hot gases produced in the vortex of the toroid of the chamber leave this chamber in the manner illustrated by the arrows 171 and 166 through duct 73 which is provided with walls 122 and 123 on the output side of this duct and an additional wall 170 illustrated by a dotted line. The output ducts 73 are uniformly distributed around the periphery of the chamber and also intermesh, or interleave, the air ducts 165 and 126. It may be also considered that the side walls of the ducts 126 and 165 are common walls which separate the hot gases ducts 73 from the air ducts 126 and 165.

The air entering the air ducts 126 and 165, illustrated by arrows 130, 129, 128, 127 and 150, enters combustion chamber where burning takes place first in the central portion of the toroidal chamber and to some extent in the central ducts 126.

Fuel is introduced into the chamber by means of a plurality of nozzles 174 which are uniformly distributed around the entire periphery of a ring-shaped fuel duct 175 at the inner end of the central stationary duct 146. Fuel is conveyed to this ring-shaped fuel duct 175 by means of a fuel pipe 176 (see two dotted lines) connected to a source of fuel under pressure. The direction of flow of the sprayed fuel is in the radially centrifugal direction. This finely atomized fuel is induced into duct 126 where partial burning of the fuel takes place. A more complete and final burning and complete oxidation of the fuel takes place in the central portion of toroid 14. The burned gases then expand and diffuse toward the outer wall 110 of the chamber, whereupon they leave this chamber through the hot gases ducts 73.

The ignition system includes an insulated ignition cable 180 which is connected to a ring 181. Ring 181 is insulated from duct 15 which is provided with side surfaces 182 and 183. These two vertical side-walls 182 and 183 of the groove in duct 15 constitute two parallel air gaps between the centrally located ring 181 and the side surfaces 182 and 183. Low frequency voltage is impressed on conductor 180 and a high frequency voltage is superimposed on the low frequency. The low frequency is sufficiently high to produce, for practical purposes, a substantially continuous ignition of the mixture entering duct 126.

The compressor and turbine rotors are provided with labyrinth seals which, because of the small scale of the drawing, are not illustrated in this figure or any subsequent figures. Seals of this type are known in the art and, therefore, need not be illustrated or discussed here.

The functioning of the power plant should be apparent from the description given thus far. However, a brief description will be given here, which is as follows: ambient air enters compressor hood 21 and then flows through stator 20 and the four compressor stages in the manner indicated by an arrow 185. The compressed air then is divided into two main streams. One is illustrated by an arrow 147, which is the air going to a load turbine or some other machine requiring compressed air for its operation, while the remaining compressed air is divided into a plurality of streams illustrated by arrows 130, 148 and 134. Stream 130 and part 150 of stream 148 enter toroid 14 of the combustion chamber where the main burning of fuel 178 injected by orifices 174 takes place. Heated gases than leave the toroidal combustion chamber through ducts 73, this flow being indicated by arrow 166. The centrifugal flow input channel, defined by the walls 74 and 68, receives heated gases 166 (see the arrows) as well as compressed air 152 and 140, where the air and the gas are intermixed and finally enter the four turbine stages 22 through 25 and the turbine stator 26 and exhaust duct 27. Either an external source of compressed air, or the compressed air produced by the compressor, is used for operating the four air bearings which are used for supporting the two rotors of the air generator.

Before concluding the description of FIG. 1, it should be mentioned also that, in this version of the power plant, the two rotors are not geared to each other but are free to rotate at their own independent speeds. These two speeds, however, are such that the peripheral velocities of the outer peripheries of the two rotors are substantially equal throughout the speed range of the power plant, or the load range of the power plant. This is obtained by proportioning the turbine stages so that they supply exactly the power required by the compression stages and the power lost in the compressor, the combustion chamber and the turbine.

The air generator of FIG. 1 can be very readily converted into a gas generator by closing the central duct 15 and by directing the entire flow of compressed air to the combustion chamber and the turbine. The above conversion is illustrated by dotted lines 157 and 156 which define the boundaries of the stationary duct 15 for conveying the entire air to chamber 14 and the input stage 22 of the turbine. With this modification, the power plant becomes a gas generator which furnishes hot compressed gases for doing external work.

Figure 2:
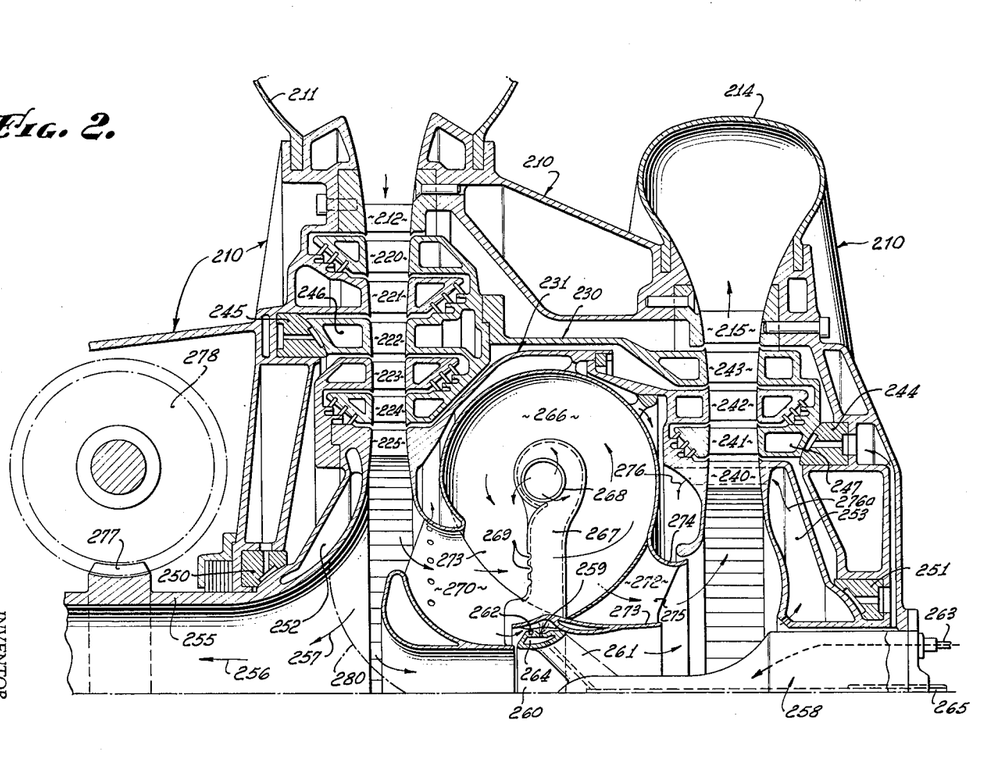
FIGURE 2 is a longitudinal, axial section of an additional version of the power plant in which the compressor includes a vector adjusting stage.

FIGURE 2 discloses another version of an air generator which has two contra-rotatable rotors and a stationary vector stage between the first and the second compression stages. The combustion chamber rotates with the inner rotor and it is also a toroidal chamber, as in the prior figure. Only a brief description of this air generator is necessary because of its similarity with the prior figure.

The outer frame 210 includes a hood 211 for the centripetal flow compressor, a compressor stator 212, an exhaust hood 214, a turbine stator 215, and a vector-adjusting stage 221 which is positioned between the co-rotatable compression stages 220 and 222, of the first, or outer, rotor 230. The second rotor is rotor 231. The compressor also includes additional stages 223, 224 and 225. The compression stages 220, 222 and 224 belong to the first rotor, while the compression stages 223 and 224 belong to the second, or inner, rotor 231. The turbine includes the rotatable stages 240, 241, 242 and 243. The turbine stages 240 and 242 belong to the inner rotor 231 and the turbine stages 241 and 243 belong to the outer rotor 230. The inner-most turbine stage 240, or the turbine input stage, is an air-cooled stage with compressed air flowing through the hollow blades of the turbine, as illustrated by arrows 276 and 276a. The outer rotor 231 is mounted on air bearings 244 and 245 which engage directly rotor 230. Bearing 245 engages a hoop ring 246 while bearing 244 engages a hoop ring 247. Accordingly, the outer rotor 230 of the air generator does not have any side disks. This is made possible by the fact that air bearings are now available which are capable of operating at high speds, such as 2000 feet per second. The inner rotor 231 is mounted on air bearings 250 and 251 which engage hollow side disks 252 and 253, respectively, of the inner rotor. Side disk 252 merges into a rotatable outgoing hollow shaft 255 which is used for conveying compressed air in the manner indicated by arrows 256 and 257 to some machine requiring compressed air for its operation. The power plant is also provided with a stationary, axially and centrally located member 258 which is used for conveying fuel to a plurality of nozzles 259, which are uniformly distributed around the entire periphery of a hollow ring 260. Ring 260 is connected to member 258 by means of one or a plurality of hollow spokes 261 which have the cross-sectional shape of an airfoil. Ring 260 is also provided with an insulated ignition ring 262 which is connected to an ignition cable 263. A fuel duct 264 is provided in the hollow ring 260, and this duct is connected to an external fuel duct 265 which supplies fuel to duct 264 and to the nozzles 259. The main toroid 266 of the chamber is provided with a plurality of hollow, fuel and air mixing ducts 267 which terminate in snail-like central portions 268. The ducts 267 are provided with a plurality of openings 269 which admit the incoming compressed air into duct 267. Ducts 267, like spokes in a wheel, are uniformly distributed around the periphery of toroid 266 and the central stationary air duct 260. Ducts 267 are positioned in line with the air leaving input ducts 270 which are also uniformly distributed around the periphery of the input side of toroid 266. Ducts 270 alternate, around the periphery, with the output ducts 272 of the toroid, with ducts 270 being in the same radial planes as curved wall members 279. Wall members 279, in turn, alternate with the ducts 272. The output ducts 272 have bottom and top walls 273 and 274 and side walls 275. Fuel from the nozzles 259 is injected into the ducts 267 and this fuel is ignited and partially burns in ducts 267. Since there is a deficiency of oxygen in these ducts, not all of the burning takes place in ducts 267, but the main burning takes place after the gases leave ducts 267 and enter the central portion of the chamber through the snail-shaped central members 268 of the chamber.

The operation of this power plant should be apparent from the disclosure given thus far, and also from the prior description of the functioning of the similar power plant given in connection with the description of FIG. 1. Suffice to say that the external shaft 255 is used for driving an auxiliary equipment, generally required with power plants of this type, by means of gears 277 and 278. These auxiliaries are known in the art and generally include electric generators, fuel pumps, etc. The function performed by the vector adjusting stage 221 is outlined in detail in the co-pending application Serial No. 514,001, identified more fully earlier. It enables one to obtain constant Mach number operation in all the stages of the compressor.

The air generator of FIG. 2 can be converted very readily into a gas generator by directing the entire air flow into combustion chamber 266 and the input stage 240 of the turbine. This conversion is accomplished by closing duct 256 in the manner illustrated by a dotted line 280.

Figure 3:
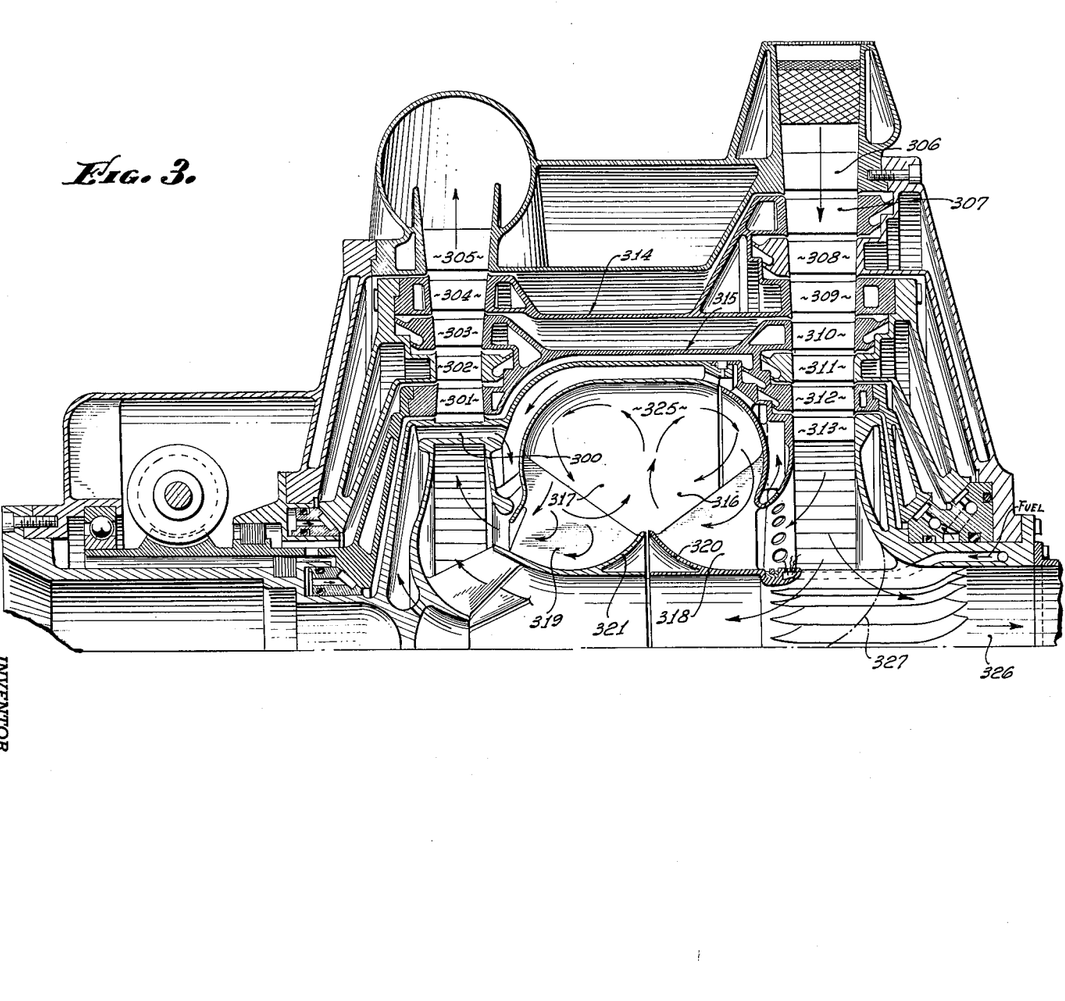
FIG. 3 is a longitudinal, axial section of an additional version of the power plant with a stationary combustion chamber and two rotors.

FIGURE 3 is a longitudinal, axial, sectional view of the air generator, or a gas generator, having two multi-stage, contra-rotatable rotors and a stationary combustion chamber with two adjoining vortices. Only a brief description of this figure is necessary since it does not differ materially from the prior figures. The number of the rotatable turbine stages is four, which is the same number as that used in FIGS. 1 and 2. They are stages 301 through 304. The turbine also includes an air-cooled expansion stator 300 and a diffuser stator 305 whose functions are described more in detail in the U.S. application Serial Number 513,947. The compressor includes, in the order of the centripetal flow, stator 306, the first compression stage 307, a vector-adjusting stage 308, the compression stages 309 through 312 and a stator 313. The first, or the outer, rotor 314, therefore, includes the first, second and fourth compression stages 307, 309 and 311, and the second and fourth turbine stages 302 and 304. The second rotor 315 includes the third and the fifth rotatable compression stages 310 and 312, and the first and the third turbine stages 301 and 303.

The combustion chamber includes first and second vortices 316 and 317. Compressed air and fuel enter the first vortex 316 and then, after burning, and also in the course of burning the formed hot gases diffuse into the second vortex 317, whereupon they leave the second vortex on the way to stator 300 of the turbine. The chamber is provided with two sets of radially disposed vanes 318 and 319 which are uniformly distributed around the periphery of the chamber. These vanes maintain the the directions of flow within the vortices in the radial planes. The chamber is also provided with curved, circular wall members 320 and 321 which also guide the flow of gases into the respective vortices 316 and 317.

Figures 4, 5:
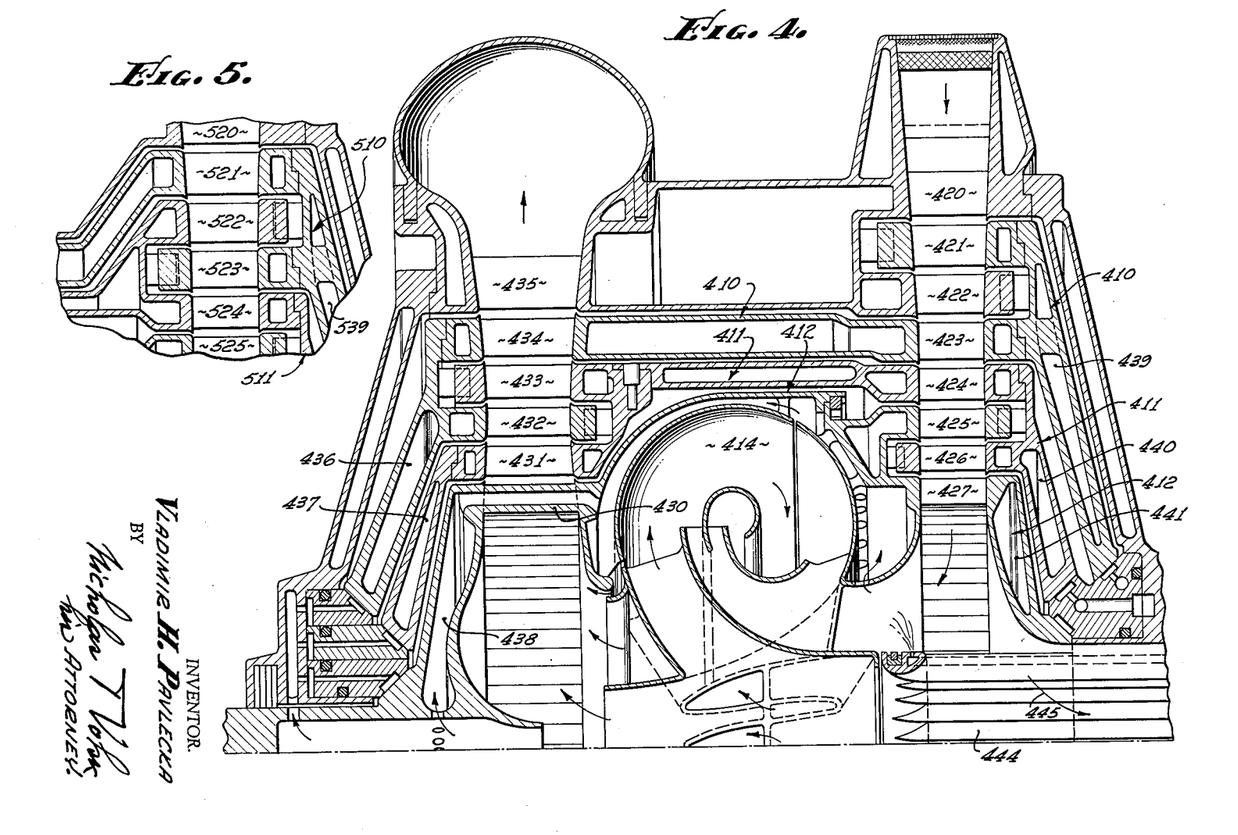
FIG. 4 is the longitudinal, axial sectional view of the power plant having three rotors and a rotatable combustion chamber.
FIG. 5 is a sectional view of the upper portion of a compressor of the type disclosed in FIG. 4 in which the stationary vector adjusting stage has been replaced with the rotatable stage of the compressor.

The stationary combustion chamber 325 may be made a part of the inner rotor 315 to make it rotatable, in accordance with what is disclosed in FIGS. 1, 2 and 4; correspondingly the rotatable chambers of FIGS. 1, 2 and 4 may be made stationary in accordance with the teachings of FIG. 3.

The power plant of FIG. 3 may be either an air generator or a gas generator, depending upon the shape of the stationary duct 326. When duct 326 is open to the right, the power plant becomes an air generator; when it is closed in the manner indicated by a dotted line 327, it is a gas generator.

The power plant of FIG. 3 will have a considerably higher compression ratio than that in FIG. 1 because of a larger number of compression stages—5 rotatable stages, a vector stage, and two stators 306 and 313—as compared to four rotatable stages and an input stator in FIG. 1. The power capabilities of the power plants in FIGS. 2 and 3 are substantially the same. Therefore, from the point of view of the total number of stages involved, it follows that it is preferable to have a rotatable combustion chamber rather than a stationary chamber. The stationary chamber power plant has a lighter second rotor and the two rotors are more equally balanced than in FIGS. 1, 2 and 4.

FIGURE 4 illustrates an air generator which includes three rotors 410, 411 and 412 and a stationary vector-adjusting stage. Combustion chamber 414 is identical to that illustrated in FIG. 1. It is connected to the third rotor and constitutes an integral part of this rotor. Therefore, this power plant, as disclosed, has a rotatable chamber. As mentioned previously, the chamber can be made stationary in the manner illustrated in FIG. 3. In all other respects, this power plant is similar to that disclosed in the prior figures and, therefore, needs no detailed description. The compressor has the following stages: stationary contra-prerotation stage, or stator 420, the first compression stage 421, the vector-adjusting stage 422 and five additional compression stages 423 through 427. The compression stages 421 and 423 belong to the first rotor 410; the compression stages 424 and 426 belong to the second rotor 411, and the compression stages 425 and 426 belong to the third, or the innermost, rotor 412. The turbine includes 5 rotatable stages 430 through 434 and a stator 435. The third rotor 412 has one turbine stage 430 which is an air-cooled stage. The second rotor 411 has two turbine stages 431 and 433 and the outermost rotor 410 has the turbine stages 432 and 434. The side disks 436 through 441 are hollow disks and each has two wall members which are shaped in the manner illustrated in the figure. The power plant is also provided with a stationary duct 444 which conveys compressed air through this duct in the direction illustrated by an arrow 445.

This power plant can be converted into a gas generator by closing off duct 444 in the manner indicated by a dotted line 446.

This power plant has three rotors, six rotatable compression stages and five rotatable turbine stages. Therefore, it will have a higher horsepower rating and higher compression ratio than any of the preceding power plants.

FIGURE 5 illustrates a modified version of the compressor shown in FIG. 4. In FIG. 4 the compressor includes the vector-adjusting stage 422. In FIG. 5 this stage was converted into a rotatable stage 522 which is a part of the second rotor 511. The vector-adjusting stage 422, therefore, has been eliminated altogether and the compressor converted into a compressor with seven rotatable stages. The advantages obtainable with the vector-adjusting stages are outlined in detail in the co-pending application Serial No. 514,001. However, the same application also describes the methods of obtaining an asymmetric vector-diagram without the vector stages, and such mode of operation then is applicable to the compressor disclosed in FIG. 5.

All of the disclosed power plants have at least two or more contra-rotatable rotors which are loaded, or proportioned, so as to make the absolute magnitude of the peripheral velocities of the outermost compressor stage of each rotor equal to each other. For example, in FIGURE 4, the peripheral velocities of the compressor stages 421, 424 and 425 are equal at the design point and also throughout the operating range of the power plant. Such load distribution among the turbine stages 430 through 434 and also corresponding loading of the compressor stages 421 through 427 enables one to obtain the above-mentioned equal peripheral velocities (absolute magnitudes) and this, in turn, produces high compression ratio throughout the compressor because high peripheral velocities become obtainable even in the innermost stages of the compressor, such as stages 425, 426 and 427. Accordingly, the kinetic as well as the potential energies generated in the air being compressed by the innermost stages of the compressor are high with the corresponding increase in the overall compression ratio. A constant Mach number operation is the result.

Examination of the geometry of FIGURE 4, as well as of the preceding figures, very readily indicates the fact that the number of the rotors used in the power plants can be increased to any desired number, which certainly can be a larger number than three, the latter number being the number of rotors used in FIGURE 4. When the local entry Mach number approaches 1.0, a reasonably high compression ratio, such as 10 to 1, or 15 to 1, is obtainable, for example with three rotors. Such ratio is sufficiently high for conventional applications or use of the disclosed power plants and for this reason a larger number of rotors has not been illustrated.

In claiming the invention, some of the claims will use such terminology as "a plurality of rotors" and "a plurality of stages." According to Webster's definition of the word "plurality," it shall mean "denoting more than one; applying to more than one. . . ."

The disclosed power plants have by far the best specific weight and specific volume as compared to the specific weights and volumes of the known power plants. For example, the specific weight of the disclosed power plants is of the order of .06 pound per pound of thrust and the specific volume is seven cubic inches per pound of thrust for a jet power plant having a total thrust of 15,000 pounds. The above figures for the best axial flow power plant known to date (De Havilland Gyron) are as follows: specific weight of .25 pound per pound of thrust and specific volume of twenty cubic inches per pound of thrust for an engine having 15,000 pounds total thrust. With the above reduction in the specific weight and specific volume, it becomes possible to mount the jet engines of the disclosed type within the wing structures with the rotational axis of the power plant being substantially vertical. Such mounting of the engines in aircraft reduces their drag by approximately 25%, which is the percentage of drag produced by the axial flow jet engines mounted in the pods and suspended from the wings. This is the type of mounting that is commonly used at the present time in the majority of the jet aircraft. The reduction in the drag produces very large reductions in total weight of the plane, which is the worst enemy of any aircraft, either military or commercial type.

For the bypass jet power plants utilizing the disclosed structures, reference is made to the co-pending application, Serial No. 759,625, filed September 8, 1958, and entitled "Bypass Jet Engines Using Centripetal Flow Compressors and Centrifugal Flow Turbines." The bypass engines add an additional advantage to the power plants disclosed here by also introducing an additional bypass compressor which introduces the compressed air flowing through this bypass compressor directly into the jet pipe. It is known that the propulsive efficiency of jet aircraft is maximum when the flow of hot gases and of the compressed air from the bypass compressor is in the 1 to 1 ratio. Hence the reason for the bypass engines.

What is claimed as new is:

1. A gas turbine power plant including a centripetal flow compressor, a centrifugal flow turbine and a combustion chamber, said compressor and turbine comprising at least first and second rotors, each rotor having at least two centripetal flow compression stages and at least two centrifugal flow turbine stages, the compression and turbine stages of the respective rotors having their respective blades oriented for rotation of the first rotor in one direction and of the second rotor in the opposite direction, said compression and turbine stages constituting integral parts of the respective rotors, all of said compression stages being positioned in symmetric relationship with respect to a first transverse plane bisecting said compressor and being perpendicular to the common axis of rotation of said rotors, and a second transverse plane passing through and bisecting said turbine, said planes being parallel to and spaced from each other to accommodate said combustion chamber between said first and second planes the compression stages of the first rotor intermeshing the compression stages of the second rotor, and the turbine stages of the first rotor intermeshing the turbine stages of the second rotor.

2. A gas turbine including a centripetal flow compressor, a combustion chamber and a centrifugal flow turbine, said compressor and turbine comprising first, second and third rotors, said first rotor including—counting all rotatable compression stages in the centripetal direction and all turbine stages in the centrifugal direction—first and third compression stages of said compressor and third and fifth stages of said turbine; said second rotor including second, fourth and sixth stages of said compressor and second and fourth stages of said turbine, and said third rotor including fifth and seventh compression stages and first turbine stage, said combustion chamber being mounted approximately in the geometric center of said power plant between the seventh compression stage and the first turbine stage, said chamber being a mechanical and fluid dynamic spacer between said seventh compression stage and said first turbine stage.

3. A gas turbine power plant including a centripetal flow compressor, a centrifugal flow turbine driving said compressor and a combustion chamber surrounding the common axis of rotation of said compressor and turbine and being positioned between first and second transverse planes bisecting said compressor and turbine, respectively; said compressor and turbine comprising a plurality of concentric rotors, each rotor including at least two compression stages and at least one turbine stage, the compression stages of the adjacent rotors intermeshing each other, the staging and the blading of the centrifugal flow turbine being arranged to produce the rotation of adjacent rotors in the opposite directions, and the staging and the blading of the compression stages of said centripetal compressor being arranged to produce the intermeshing of the compression stages of the adjacent rotors, all of the adjacent rotors being contra-rotatable rotors with respect to each other, and all of the adjacent compression stages being contra-rotatable compression stages.

4. The power plant as defined in claim 3 which also includes a stationary member positioned along the rotational axis of said compressor and turbine, said member having an inner, hollow, cylindrical open end including a plurality of turning and flow-directing blades circumferentially positioned around the periphery of said open end, said blades terminating in a ring, the mid-portion of said blades being in a transverse plane bisecting said compressor, said open end and its blades receiving some of the compressed air leaving said compressor in the centripetal direction and turning its flow in the axial direction.

5. The power plant as defined in claim 4 in which said member includes an ignition cable, a metallic ring insulatively mounted on said ring and connected to said cable, said two rings constituting an electrical spark-gap ignition system for said combustion chamber.

6. The power plant as defined in claim 4 which includes a fuel duct positioned in said member, a hollow ring included in said ring, said hollow ring being connected to said fuel duct, and a plurality of fuel nozzles circumferentially positioned around said hollow ring for injecting fuel into said chamber.

7. The power plant as defined in claim 3 in which said combustion chamber is an integral part of the innermost rotor, whereby said innermost rotor includes at least two compression stages, said combustion chamber and at least one turbine stage.

8. The power plant as defined in claim 3 in which said combustion chamber is a stationary chamber, said power plant including a frame for supporting said chamber and rotatively supporting the rotors of said power plant.

9. The power plant as defined in claim 3 in which said combustion chamber is a stationary chamber surrounded by the innermost rotor, said innermost rotor including the last compression stage and the first turbine stage, said chamber being a toroid having a stationary, flow-directing input diffuser stage fluid-dynamically coupled to and following the last compression stage, and a stationary expansion stage on the output side of said chamber for accelerating and directing the flow of gases leaving said chamber, said expansion stage discharging into said first turbine stage.

10. Gas turbine power plant including a centripetal flow compressor and a centrifugal flow turbine, said compressor and turbine including a plurality of concentric rotors having a common axis of rotation, each rotor including a plurality of compression stages and at least one turbine stage, the compression stages of one rotor interleaving, or intermeshing, the compression stages of the succeeding rotor, each rotor having compressor blading and turbine blading, the blading in the odd-numbered rotors being arranged to rotate said rotors in a clockwise direction and the blading in the even-numbered rotors being arranged to rotate them in a counter-clockwise direction.

11. A gas turbine power plant including a centripetal flow compressor, a combustion chamber and a centrifugal flow turbine, said compressor and turbine comprising at least first and second contrarotatable rotors, said first and second rotors representing, respectively, first and second unitary, integrated units, each rotor unit having a plurality of compression stages and a plurality of turbine stages, the turbine stages of the first rotor interleaving the turbine stages of the second rotor, and at least some of the compression stages of the first rotor interleaving the compression stages of the second rotor, said compression stages being spaced from said turbine stages by an axial spacing along a common axis of rotation of said rotors, said rotors being concentric with respect to each other; first and second rings having the same axis of rotation with said rotors, said first ring surrounding and being in spaced relationship with respect to said second ring, said first and second rings extending in the axial direction through said axial spacing, said first ring laterally interconnecting the compression and turbine stages of the first rotor to produce said first unitary integrated unit, said second ring laterally interconnecting the compression and turbine stages of the second rotor to produce said second unitary integrated unit, said first rotor being the outer rotor and said second rotor being the succeeding rotor, and a combustion chamber placed directly in said axial spacing, the outer portion, or the outer periphery, of said combustion chamber being surrounded by said second ring.

12. The power plant as defined in claim 11 which also includes a stationary frame surrounding said first and second rotors and said combustion chamber, a first air bearing having a first bearing rotor and first bearing stator, said bearing stator being mounted on said frame, and said bearing rotor being mounted directly on the outer side of one of the compression stages of said first compressor-turbine rotor, and a second air bearing supporting the opposite end of said first compressor-turbine rotor, said second bearing having its rotor mounted directly on the outer side of one of the turbine stages of said first compressor-turbine rotor, third and fourth air bearings for rotatively supporting said second rotor on said frame, and duct means connecting all of said air bearings to compressed air from said compressor for operating said bearings.

13. The power plant as defined in claim 12 which also includes a stationary vector-adjusting stage on the compressor side of said power plant, said compressor having the following order of compression stages in the centripetal direction: the first, or the outermost, compression stage, said stationary vector-adjusting stage, the second compression stage, and at least the third, fourth, fifth and sixth compression stages, said first, second and fourth compression stages being the compression stages of the first rotor all mechanically connected to said first ring, and said third and fifth stages being the compression stages of the second rotor all mechanically connected to the second ring.

14. A gas turbine power plant comprising a plurality of contrarotatable concentric rotors, each rotor having a plurality of centripetal flow compression stages and a plurality of centrifugal flow turbine stages, the compression stages of the outer, or first, rotor interleaving some of the adjacent outer compression stages of the succeeding, or second, rotor; and the remaining inner compression stages of said second rotor interleaving the compression stages of the third rotor, the turbine stages of the respective rotors interleaving each other in like manner as the compresion stages of said rotors.

15. The gas turbine power plant as defined in claim 14 in which said compressor includes first, second and third rotors and the following order of stages; an input compressor stator, first through sixth compressor stages, and a stationary vector-adjusting stage positioned between the first and the second compressor stages of the first rotor, said second rotor including the third and fifth compressor stages, and the third rotor including the fourth and the sixth compressor stages.

16. The gas turbine power plant as defined in claim 14 in which said power plant includes at least first, second and third rotors, said first rotor having at least two compressor and two turbine stages, said second rotor having at least three compression and two turbine stages, and said third rotor having at least two compression and one turbine stages.

17. The power plant as defined in claim 16 in which said third rotor also includes a rotatable combustion chamber.

18. A gas turbine power plant comprising a centrally positioned stationary combustion chamber having a centripetal flow diffusion stator on the input side and a centrifugal flow expansion stator on the output side; a plurality of concentric rotors surrounding said chamber; each rotor including a plurality of centripetal flow compressor stages and at least one centrifugal flow turbine stage; the innermost rotor including the output compressor stage and the input turbine stage; the output compressor stage surrounding and discharging into said diffusion stator, and the input stage of said turbine surrounding and receiving hot gases from said expansion stator; all of the turbine stages being symmetrically located with respect to a first transverse plane bisecting said turbine stages and said expansion stator, and all of the compressor stages being symmetrically located with respect to a second transverse plane bisecting said compressor stages, and said diffusion stator, said planes being parallel with respect to each other and spaced from each other, said combustion chamber being located between said two planes.

19. A gas turbine power plant comprising a plurality of freely rotatable concentric rotors mechanically disconnected from each other and including a plurality of centripetal flow compression stages for each rotor, said compression stages constituting a centripetal flow compressor, said rotors also including a plurality of centrifugal flow turbine stages constituting a centrifugal flow turbine driving said compressor, each rotor having its respective outer compression stage; said compression and turbine stages being loaded and proportioned so as to produce substantially equal peripheral speeds for all of said respective outer compression stages throughout at least the greater portion of the operating range of said power plant.

20. A gas turbine power plant including a plurality of concentric, contra-rotatable rotors; each rotor having at least two centripetal flow compression stages and at least one centrifugal flow turbine stage, said turbine being a contra-rotatable turbine; at least some of the adjacent compression stages of the adjacent rotors interleaving each other to produce a contra-rotatable centripetal flow compressor, connected on one side to and driven from one side by said contra-rotatable turbine.

21. A gas turbine power plant including at least first and second concentric rotors rotating in opposite directions, said first rotor having at least two centripetal flow compression stages and at least one centrifugal flow turbine stage, and said second rotor including at least one centripetal flow compression stage and at least one centrifugal flow turbine stage, said centripetal flow compression stage of the second rotor interleaving between the said two compression stages of the first rotor.

22. A power plant comprising at least first and second concentric rotors; said first rotor including a first portion of a centripetal flow compressor with its first and third centripetal flow rotatable compression stages; said first rotor also including a first portion of a centrifugal flow turbine with at least its last, or outermost, turbine stage; a first ring interconnecting said first portion of the turbine with said first portion of the compressor; and said second rotor including a second portion of said centripetal flow compressor and at least second and fourth centripetal flow rotatable compression stages; said second rotor also including a second portion of said centrifugal flow turbine and at least one of the turbine stages belonging to said second portion of the turbine; and a second ring interconnecting said second portion of the turbine with the second portion of the compressor; said first and second rotors being contra-rotatable rotors with at least the second compression stage of the second rotor intermeshing with the first and third compression stages of the first rotor.

References Cited in the file of this patent

UNITED STATES PATENTS

| | | |
|---|---|---|
| 2,360,130 | Heppner | Oct. 10, 1944 |
| 2,471,892 | Price | May 31, 1949 |
| 2,626,501 | Pavlecka | Jan. 27, 1953 |
| 2,695,198 | Brugger | Nov. 23, 1954 |
| 2,804,747 | Pavlecka | Sept. 3, 1957 |

FOREIGN PATENTS

| | | |
|---|---|---|
| 753,652 | Great Britain | July 25, 1956 |
| 753,561 | Great Britain | July 25, 1956 |